3,636,169
PROCESS FOR THE PRODUCTION OF 1,1,1-TRI-FLUORO-2-MONOCHLORO - 2 - MONOBROMO-ETHANE BY DEBROMINATION OF 1,1,1-TRI-FLUORO - 2 - MONOCHLORO - 2,2-DIBROMO-ETHANE
Andrea Scipioni and Giampaolo Gambaretto, Padova, Italy, assignors to Montecatini Edison S.p.A., Milan, Italy
No Drawing. Filed Dec. 30, 1968, Ser. No. 788,047
Int. Cl. C07c *19/08*
U.S. Cl. 260—653           6 Claims

ABSTRACT OF THE DISCLOSURE

The invention is concerned with a process for the production of 1,1,1 - trifluoro - 2-chloro-2-monobromethane which comprises reacting 1,1,1-trifluoro-2-chloro-2,2-dibromoethane with an alcohol selected from aliphatic and aromatic alcohols in alkaline phase, the molar ratio between alcohol and 1,1,1-trifluoro-2-chloro-2,2-dibromoethane being at least equal to 1.

---

The present invention is concerned with a process for the production of 1,1,1-trifluoro-2-monochloro-2-monobromoethane ($CF_3CHClBr$) by selective debromination of 1,1,1-trifluoro-2-monochloro-2,2-dibromoethane $$(CF_3CClBr_2)$$

The commercial production of 1,1,1-trifluoro-2-monochloro-2-monobromoethane is presently based on processes involving the bromination of 1,1,1-trifluoro-2-monochloroethane.

1,1,1-trifluoro-2-monochloroethane is, on its turn, prepared, for instance, by fluorination of trichloroethylene with hydrofluoric acid in liquid or gaseous phase. 1,1,1-trifluoro-2-monochloroethane may also be obtained by reaction of hydrofluoric acid with asymmetric tetrachloroethane in the presence of antimony pentachloride. Asymmetric tetrachloroethane may be obtained either by reaction of hydrochloric acid with trichloroethylene or by direct chlorination of asymmetric dichloroethylene.

Another known process for the preparation of 1,1,1-trifluoro-2-monochloroethane is based on the chlorination of 1,1,1-trifluoroethane which may be obtained, for instance, by fluorination of 1,1,1-trichloroethane with hydrofluoric acid in the presence of antimony pentachloride.

The bromination of 1,1,1-trifluoro-2-monochloroethane is usually carried out either in liquid phase or in gaseous phase at temperatures between 350° C. and 600° C., more often at temperatures between 450° C. and 550° C., depending on the molar ratios, the contact times, the reactants, the type of reactor, etc. used.

It is also known to prepare 1,1,1-trifluoro-2-monochloro-2-monobromoethane by reduction of 1,1,1-trifluoro-2-monochloro-2,2-dibromoethane by means of hydrogen obtained by reaction of an acid (such as for instance hydrochloric acid or acetic acid) with iron.

From the same starting material, 1,1,1-trifluoro-2-monochloro-2,2-dibromoethane, it is also possible to obtain 1,1,1 - trifluoro - 2-monochloro-2-monobromoethane by means of an intermolecular rearrangement between $$CF_3CClBr_2$$

and $CF_3CH_2Cl$ at high temperatures (480° C.–530° C.).

All these methods, however, have many inconveniences of various nature.

The bromination of $CF_3CH_2Cl$ to $CF_3CHClBr$, at high temperature, according to the reaction scheme:

$$CF_3CH_2Cl + Br_2 \rightarrow CF_3CHClBr + HBr$$

is accompanied by side reactions such as dibromination reactions, intermolecular rearrangement reactions, condensation reactions, dehydrohalogenation reactions, disproportionation reactions, which lead to the formation of undesired side products, in more or less high amounts, depending on the reaction conditions used. The formation of side products not only decreases the yield of the process, but, in addition, leads to great difficulties in the separation stage which is necessary to obtain the desired end product with a high degree of purity.

These undesired side reactions occur, in particular, at the conditions used in the commercial plants, where, in order to obtain the highest yields and reaction rates, very high temperatures (500° C.–550° C.) are generally used.

The reduction process based on the use of hydrogen and iron also has inconveniences of the same kind. The conversion yields are, in particular, very low and are generally comprised between 26 and 45%. The side products include substantial amounts of $$CF_3-CCl=CCl-CF_3$$

Similar inconveniences are present also in the processes based on intermolecular rearrangement reactions.

$CF_3-CClBr_2$, which is the starting material used in the process of the present invention, is present, as side product and in more or less high amounts, in the reaction products.

The processes known in the art, moreover, are carried out in a highly corrosive environment because of the presence of halogens and hydrohalogens, either as reactants or as reaction products, and because of the high temperatures used. This requires the use of materials capable of withstanding such severe operating conditions and implies practical and economical disadvantages.

We have now surprisingly found, according to the present invention, that when $CF_3CClBr_2$ is treated with alcohols, in alkaline phase, a selective dehalogenation takes place, leading to the formation of $CF_3CHClBr$.

$CF_3CClBr_2$, which is the starting material used in the process of the present invention, may be obtained, for instance, as side product and in more or less high amounts during the preparation of $CF_3CHClBr$, at high temperatures, using the above mentioned bromination process of $CF_3CH_2Cl$.

$CF_3CClBr_2$ is an undesired substance since, as said, its formation increases the cost of the process. Many researches have therefore, been carried out either to reduce the formation of this substance or to convert it in $$CF_3CHClBr$$

which constitutes the useful end product.

In the process which is the object of the present invention 1,1,1-trifluoro-2-monochloro-2-monobromoethane is produced by reacting 1,1,1-trifluoro-2-monochloro-2-,2-dibromoethane with an alcohol and in alkaline phase using a molar ratio between alcohol and 1,1,1-trifluoro-2-monochloro-2,2-dibromoethane of at least 1. The alkalinity of the reaction phase is reached by using a base as component of the reaction mixture.

If, for instance, KOH is used as a base, the reaction scheme may be represented as follows:

$$CF_3CClBr_2 + ROH + KOH \rightarrow$$
$$CF_3CHClBr + KBr + RCH = O + H_2O$$

in which R represents a radical of a linear or branched aliphatic primary, secondary or tertiary alcohol or a radical of an aromatic alcohol.

Instead of KOH any other base may be used selected from the group consisting of bases of alkali metals, alkali-earth metals, and amines. Preferred amines are aliphatic primary or secondary amines.

$CF_3CClBr_2$ is reduced at the expenses of the alcohol which is oxidized to an aldehyde, when the alcohol is a primary alcohol. The aldehyde is present in the alkaline reaction phase in semi-acetalic form. When secondary alcohols are used, ketones will obviously be formed, instead of aldehydes.

The reaction takes place with good results even at room temperature. Higher reaction rates are, however, obtained when the temperature is raised up to the boiling point of the mixture consisting of the alcohol, the dibrominated compound and the base.

When the process is carried out at such temperatures, it is also easier to continuously withdraw the $CF_3CHClBr$ produced from the reaction zone, while the formation of side products is reduced to a minimum value.

According to the present invention, any linear or substituted aliphatic primary, secondary, or tertiary alcohol, as well as any aromatic alcohol may be used. Primary or secondary alcohols of low molecular weight, such as methyl, isopropyl or benzyl alcohol, or generally, alcohols which may more easily lose the hydrogen necessary to the reaction, that is alcohols having a higher reactivity, are preferably used. These alcohols have also the advantage of being more soluble in the presence of KOH or NaOH, preferably used as base, and of having a low boiling point. Strong bases are preferably used. Such bases are selected from the group consisting of strong inorganic bases of alkaline or alkaline-earth metals, preferably KOH or NaOH, organic bases such as amines. Weak bases may also be used although they are less reactive.

In the process of the present invention it is sufficient to use a stoichiometric molar ratio between $CF_3CClBr_2$ and the alcohol. Since, however, a solid phase is formed during the reaction, it is useful to have an excess of alcohol in order to dissolve the alkali necessary to the reaction and to keep the suspension formed during the reaction in a sufficiently fluid state. The use of an excess of alcohol, moreover, facilitates the formation of the semi-acetal, when this is possible, and makes it also easier to control the reaction temperature while, at the same time, increasing the reaction rate. For this reason, the molar ratio between the alcohol and the dibrominated compound is in practice maintained at values which are at least stoichiometric or at higher values.

The molar ratio between the alkaline material and the dibrominated compound varies between 0.1 and 2, preferably between 1 and 1.5.

According to a possible embodiment, the process of the present invention is carried out by adding to the alcoholic solution of the dibrominated compound, the alcoholic alkaline solution, for instance, a solution of KOH or NaOH, while stirring and while controlling the temperature.

After the addition of the alcoholic alkaline solution has been completed, the mixture is kept at the reaction temperature until the reaction is completed.

After a control of the neutrality of the mixture, the formed salt is separated and the mixture is distilled in order to recover the resulting product.

By operating under such conditions, together with the main reaction product, $CF_3CHClBr$, a certain amount of side products are also obtained, which products comprise, in addition to the unreacted $CF_3CClBr_2$, products deriving from a prolonged contact of both the monobrominated and dibrominated compounds with the alcoholic alkaline reaction medium, such as $CF_3—CH_2Cl$, $CF_3—CH_2Br$, $CF_2=CClBr$, $CF_3—CHBr_2$, $CF_2=CBr_2$ and ethers of the type $RO—CF_2—CHClBr$ or $(RO)_3=CHClBr$.

These products may be easily separated by distillation from $CF_3CHClBr$, which may therefore be obtained in a sufficiently pure form.

The process may also be carried out according to a preferred further embodiment which offers the advantage of further reducing the formation of the side products since it is carried out in such a way that the contact time between the reaction phases is reduced to a minimum.

This result is achieved by carrying out the reaction at the boiling point of the mixture of alcohol and dibrominated compound and by continuously adding under these conditions, the alcoholic alkaline solution, so that the monobrominated compound which is formed is distilled and separated from the reaction zone.

An apparatus which may be used in the process of the present invention may, for example, consist of a reactor provided with a valve for the feeding of the reactants, of a stirrer to avoid conglomeration of the salts formed, and of a vapor discharge tube, sufficiently short and insulated, so as to avoid condensation and finally of a reflux tube connected with a fractionation column.

The vapors leaving from the reactor are fed into the fractionation column at about ⅓ of its height from the base. From the top of the column, there is recovered, depending on the height of the column and on the reflux used, either the pure monobrominated compound or an alcoholic solution, more or less rich in monobrominated compound.

From the base of the column, there is obtained a tail comprising the unreacted dibrominated compound and the alcohol, which re-enters the reactor through the reflux tube.

With an apparatus of this type, it is possible to regulate in the best way both the boiling temperature of the reaction mixture, the feeding rate of the reactants and the reflux ratio of the column.

The process hereinbefore described offers many advantages.

One of the advantages resides in that this process, although giving a very high yield and a product of very high purity, allows the use of reaction conditions milder than those used in the known processes.

Another advantage resides in that a starting material can be used which can be easily found at low price.

Another advantage of the present invention resides in that a very high yield is obtained while the formation of side products is reduced to such an extent that they can be easily separated from the main product.

Still another advantage of the present invention resides in that the reaction can be carried out even at room temperature.

A further advantage resides in that simple and economical apparatuses are used, whose maintenance is very simple.

The invention will now be more clearly described in the following examples.

EXAMPLE 1

276.5 g. (1 mole) of $CF_3CClBr_2$ and 600 ml. of methyl alcohol are introduced into a reaction flask provided with stirrer, funnel and reflux condensor; 84 g. (1.5 moles) of KOH dissolved in 300 ml. of methyl alcohol are added to this mixture, cooled with a water bath, while keeping the temperature at 20° C. The feeding of the alkaline alcohol solution is carried out in 2 hours and the mixture is left to react at 20° C. for an additional five hours. At the end of the reaction, the residual alkalinity (0.5 mole) is neutralized.

After separation of the salt, the following composition has been found by chromatographic analysis:

| | Moles |
|---|---|
| $CF_3—CClBr_2$ | 0.438 |
| $CF_3—CHClBr$ | 0.405 |
| $CF_3—CH_2Cl$ | 0.066 |
| $CF_3—CH_2Br$ | 0.042 |
| $CF_3—CHBr_2$ | 0.021 |
| Ethers (by difference) | 0.028 |

A molar conversion of 40.5% and molar yield of 72.1% was thus obtained.

EXAMPLE 2

276.5 g. (1 mole) of $CF_3CClBr_2$ and 300 ml. of isopropyl alcohol are introduced into the same apparatus as described in Example 1; the mixture is heated up to the boiling point and 56 g. (1 mole) of KOH dissolved in 300 ml. of isopropyl alcohol are added during 2 hours. The mixture is then kept at the boiling point for 1.5 hours. After cooling, the solution is found neutral and when analyzed by gas chrocatographic analysis, shows the following composition:

|  | Moles |
|---|---|
| $CF_3$—$CClBr_2$ | 0.186 |
| $CF_3$—$CHClBr$ | 0.577 |
| $CF_3$—$CH_2Cl$ | 0.034 |
| $CF_3$—$CH_2Br$ | 0.028 |
| $CF_3$—$CHBr_2$ | 0.014 |
| $CF_2$=$CClBr$ | 0.022 |
| $CF_2$=$CBr_2$ | 0.003 |
| Ethers (by difference) | 0.107 |

A molar conversion of 57.7% and a molar yield of 71% are found.

EXAMPLE 3

276.5 g. (1 mole) of $CF_3CClBr_2$ and 600 ml. of methyl alcohol are introduced into a flask provided with stirrer, funnel, outlet tube for the vapors and a reflux tube. The mixture is heated to the boiling point and the vapors leaving from the reactor are fed into a fractionation column, at ⅓ of its height from the bottom. The top of the fractionation column is provided with a reflux condenser having a cock and a thermometer. The tail products leaving from the column are introduced into the reaction flask through the reflux tube. The initial heating is controlled so as to have at the top of the column a temperature equal to the boiling point of the alcohol.

The alkaline alcoholic solution (84 g. (1.5 moles) of KOH dissolved in 300 ml. of methyl alcohol) is then gradually introduced.

The feeding rate of the alkaline alcoholic solution and the withdrawal of the products are regulated so that a temperature of about 55–56° C. is kept at the top of the column.

Under such conditions, the feeding requires about 2 hours and the reaction continues until both the temperature at the top and the temperature at the bottom of the column reaches the boiling point of the alcohol.

The analysis of the alcoholic solution which is separated gives the following composition:

|  | Moles |
|---|---|
| $CF_3$—$CClBr_2$ | 0.081 |
| $CF_3$—$CHClBr$ | 0.727 |
| $CF_3$—$CH_2Cl$ | 0.149 |
| $CF_3$—$CH_2Br$ | 0.011 |
| $CF_2$=$CBr_2$ | 0.020 |
| $CF_3$—$CHBr_2$ | 0.012 |

A molar conversion of 72.7% and a molar yield of 79.1% are obtained.

EXAMPLE 4

The apparatus and the conditions of Example 3 are used. 276 g. (1 mole) of $CF_3CClBr_2$ and 600 ml. of isopropyl alcohol are introduced into the reactor. After having reached the desired process conditions, 84 g. (1.5 moles) of KOH dissolved in 400 ml. of isopropyl alcohol are added: A temperature of about 60–65° C. is maintained at the top of the column.

The feeding lasts three hours and the end of the reaction is determined as in the preceding example. The analysis of the acetone-alcoholic solution which is separated results in the following composition:

|  | Moles |
|---|---|
| $CF_3$—$CClBr_2$ | 0.095 |
| $CF_3$—$CHClBr$ | 0.815 |
| $CF_3$—$CH_2Cl$ | 0.027 |
| $CF_3$—$CH_2Br$ | 0.016 |
| $CF_2$=$CBr_2$ | 0.023 |
| $CF_3$—$CHBr_2$ | 0.013 |

A molar conversion of 81.5% and a molar yield of 90.1% are thus obtained.

EXAMPLE 5

276.5 g. (1 mole) of $CF_3CClBr_2$ and 300 ml. of methyl alcohol are introduced into the same apparatus described in Example 1. The mixture is heated to the boiling point and 46.5 g. (1.5 moles) of monomethylamine dissolved in 600 ml. of methyl alcohol are added during two hours. The mixture is then kept at the boiling point during 1.5 hours by means of a reflux condenser. After cooling, the solution is found to be alkaline and is brought to neutrality. The organic phase is separated by dilution with water and, when analyzed, is found to have the following composition:

|  | Moles |
|---|---|
| $CF_3$—$CClBr_2$ | 0.653 |
| $CF_3$—$CHClBr$ | 0.298 |
| $CF_3$—$CHBr_2$ | 0.012 |
| $CF_2$=$CBr_2$ | 0.037 |

A molar conversion of 79.8% and a molar yield of 85.8% are thus obtained.

EXAMPLE 6

276.5 g. (1 mole) of $CF_3CClBr_2$ dissolved in 300 cc. of benzyl alcohol are introduced into a flask provided with stirrer, funnel and distillation column. The mixture is heated to the boiling point and, when this temperature is reached, the feeding of an alkaline solution consisting of 84 g. (1.5 moles) of KOH dissolved in 700 cc. of benzyl alcohol is started. The feeding and the heating are controlled in such a way that the boiling point of the monobrominated compound (50–51° C.) is reached at the top of the distillation column. The feeding of the alkaline solution lasts 1.5 hours.

After this time, the heating is continued until the temperature of 95° C. is reached at the top of the distillation column.

The gas-chromatographic analysis of the condensed product gives the following results:

|  | Moles |
|---|---|
| $CF_3$—$CClBr_2$ | 0.005 |
| $CF_3$—$CHClBr$ | 0.970 |
| $CF_2$=$CBr_2$ | 0.037 |

A molar conversion of 97% and a molar yield of 97.5% are obtained.

What we claim is:

1. A process for the production of 1,1,1-trifluoro-2-[mono]chloro-2-[mono]bromoethane which comprises
    reacting 1,1,1 - trifluoro-2-[mono]chloro-2,2-dibromoethane with
    an alcohol selected from the group consisting of lower molecular weight primary and secondary alcohols and benzyl alcohol,
    in an alkaline phase which contains a base selected from the group consisting of KOH, NaOH and monomethylamine,
    the molar ratio between the alcohol and the 1,1,1-trifluoro-2-monochloro-2,2-dibromoethane being at least equal to 1.

2. The process of claim 1, characterized in that said alcohol is selected from methyl alcohol, propyl alcohol, isopropyl alcohol, and benzyl alcohol.

3. The process of claim 1, characterized in that said base is selected from KOH and NaOH.

4. The process of claim 1, characterized in that said base is monomethylamine.

5. The process of claim 1, characterized in that the reaction is carried out at a temperature comprised between room temperature and the boiling point of the reaction mixture.

6. The process of claim 1, characterized in that the molar ratio between said base and 1,1,1-trifluoro-2-chloro-2,2-dibromoethane is comprised between 0.1 and 2, preferably between 1 and 1.5.

References Cited

UNITED STATES PATENTS 3,082,263   3/1963   McGinty et al. _____ 260—653

OTHER REFERENCES

Lovelace et al., Aliphatic Fluorine Compounds, p. 44 (1958).

DANIEL D. HORWITZ, Primary Examiner

UNITED STATES PATENT OFFICE
CERTIFICATE OF CORRECTION

Patent No. 3,636,169            Dated January 18, 1972

Inventor(s) Andrea SCIPIONI et al

It is certified that error appears in the above-identified patent and that said Letters Patent are hereby corrected as shown below:

In the heading to Column 1, immediately following "Ser. No. 788,047", read --Claims priority, application Italy, January 2, 1968, No. 11,105 A/68--.

Signed and sealed this 15th day of April 1975.

(SEAL)
Attest:

RUTH C. MASON
Attesting Officer

C. MARSHALL DANN
Commissioner of Patents
and Trademarks